(12) United States Patent
Tao

(10) Patent No.: US 11,910,316 B2
(45) Date of Patent: Feb. 20, 2024

(54) COMMUNICATION METHOD AND APPARATUS

(71) Applicant: ALIBABA GROUP HOLDING LIMITED, Grand Cayman (KY)

(72) Inventor: Zhen Tao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/157,052

(22) Filed: Jan. 25, 2021

(65) Prior Publication Data

US 2021/0153122 A1    May 20, 2021

Related U.S. Application Data

(63) Continuation of application No. PCT/CN2019/096090, filed on Jul. 16, 2019.

(30) Foreign Application Priority Data

Jul. 24, 2018  (CN) .......................... 201810821998.X

(51) Int. Cl.
*H04W 52/02* (2009.01)
*H04W 24/08* (2009.01)

(52) U.S. Cl.
CPC ....... *H04W 52/0229* (2013.01); *H04W 24/08* (2013.01)

(58) Field of Classification Search
None
See application file for complete search history.

(56) References Cited

U.S. PATENT DOCUMENTS

| 5,606,742 A | 2/1997 | Kido |
| 9,819,456 B1 | 11/2017 | Bellorado et al. |
| 2011/0176465 A1* | 7/2011 | Panta ................ H04W 52/0235 |
| | | 370/311 |
| 2014/0192912 A1 | 7/2014 | Chappel et al. |
| 2017/0339016 A1* | 11/2017 | Splitz ...................... H04Q 9/00 |
| 2018/0352536 A1* | 12/2018 | Hall ....................... H04B 1/713 |

FOREIGN PATENT DOCUMENTS

| CN | 101087220 A | 12/2007 |
| CN | 101127754 A | 2/2008 |
| CN | 104272814 A | 1/2015 |

(Continued)

OTHER PUBLICATIONS

PCT International Search Report and Written Opinion dated Sep. 27, 2019 issued in corresponding International Application No. PCT/CN2019/096090 (13 pgs.).

(Continued)

*Primary Examiner* — Adolf Dsouza
(74) *Attorney, Agent, or Firm* — Finnegan, Henderson, Farabow, Garrett & Dunner, LLP

(57) ABSTRACT

Communication methods and devices include opening a plurality of detection windows according to a preset detection period; in response to having detected a preamble of a radio frame in at least a preset number of continuous detection windows of the plurality of detection windows, switching the receiving end device to an awake state; and receiving the radio frame while the receiving end device is operating in the awake state.

12 Claims, 7 Drawing Sheets

(56) References Cited

FOREIGN PATENT DOCUMENTS

| | | |
|---|---|---|
| CN | 105472715 A | 4/2016 |
| CN | 106604377 A | 4/2017 |
| CN | 107426805 A | 12/2017 |
| CN | 107682921 A | 2/2018 |
| CN | 107690096 A | 2/2018 |
| WO | WO 2020/020011 A1 | 1/2020 |

OTHER PUBLICATIONS

First Search Report issued in corresponding Chinese Application No. 201810821998.X dated Sep. 22, 2021 (2 pages).

* cited by examiner

COMMUNICATION METHOD AND APPARATUS

CROSS-REFERENCE TO RELATED APPLICATION

The present disclosure claims the benefits of priority to International Application No. PCT/CN2019/096090, filed on Jul. 16, 2019, which claims priority to Chinese Patent Application No. 201810821998.X, filed on Jul. 24, 2018, both of which are incorporated herein by reference in their entireties.

BACKGROUND

LoRa is an ultra-long-distance transmission scheme based on spread spectrum technologies in the field of Internet of Things. LoRa has the characteristics of long transmission distance, low power consumption, multiple nodes, and low cost.

A LoRa network usually includes a terminal, a base station, and a server. Generally, an uplink signal of the terminal is directly received by the base station, and a downlink signal of the base station is directly received by the terminal. However, in some cases, signals of the base station and the terminal cannot reach each other due to attenuation or distance problems. For example, if the terminal is installed underground, the signal strength can be attenuated, making communication between the base station and the mode terminal difficult.

Arranging a relay device between the base station and the terminal can effectively address the problem that signals cannot be transmitted between the base station and the terminal due to attenuation or distance.

In order to reduce power consumption, the relay device generally runs in a sleep state, and the relay device can be awakened from the sleep state by a long preamble. The relay device periodically and quickly detects preambles in the air. If a long preamble is found, the relay device is awakened and receives a response radio frame for processing. If the relay device does not detect any long preamble, the relay device remains in the sleep state.

FIG. 1 is a schematic diagram of an existing relay device detecting a preamble. In an existing solution, the relay device can open a detection window according to a preset detection period in the sleep state to detect a preamble of a radio frame.

If the relay device does not detect a preamble in the detection window, the relay device is not switched from the sleep state to an awake state. If the relay device detects a preamble in a detection window, the relay device is switched from the sleep state to the awake state.

The preamble of the radio frame can include a standard preamble and a long preamble. The standard preamble is a preamble in a standard format specified by the LoRa Wide Area Network (WAN) protocol; and the long preamble refers to a preamble having the number of symbols more than that of the standard preamble under the same spreading factor. The long preamble can be used to wake up the relay device.

The terminal that sends radio frames with long preambles can also send a radio frame with a standard preamble. However, the relay device is usually only expected to receive the radio frame with the long preamble sent by the terminal, instead of the radio frame with the standard preamble sent by the terminal.

Conventional systems have some drawbacks. Even through the standard preamble is not intended to wake up the relay device, when the standard preamble is detected in the detection window, the relay device can be woken up by mistake, which causes a relatively high false wake-up rate of the relay device and brings about greater power consumption.

SUMMARY

Embodiments of the present disclosure provide communication methods and devices. The method can include opening a plurality of detection windows according to a preset detection period; in response to having detected a preamble of a radio frame in at least a preset number of continuous detection windows of the plurality of detection windows, switching the receiving end device to an awake state; and receiving the radio frame while the receiving end device is operating in the awake state.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

The embodiments of the present disclosure can utilize two or more continuous detection windows for detecting a preamble of a radio frame. The mechanism of continuous detection windows is utilized to distinguish between a standard preamble and a long preamble. Detection of the preamble in at least a preset number of the continuous detection windows indicates that the preamble is a long preamble and enables switching a receiving end device from a sleep state to an awake state for receiving a radio frame of the long preamble. The preset number is set that the standard preamble is detected in less than the preset number of continuous detection windows. The receiving end device is configured not to switch to the awake state when the standard preamble is detected. Therefore, the receiving end device that is intended to wake up for receiving radio frames with a long preamble is not awakened by the detected standard preambles by mistake.

Figure 1:
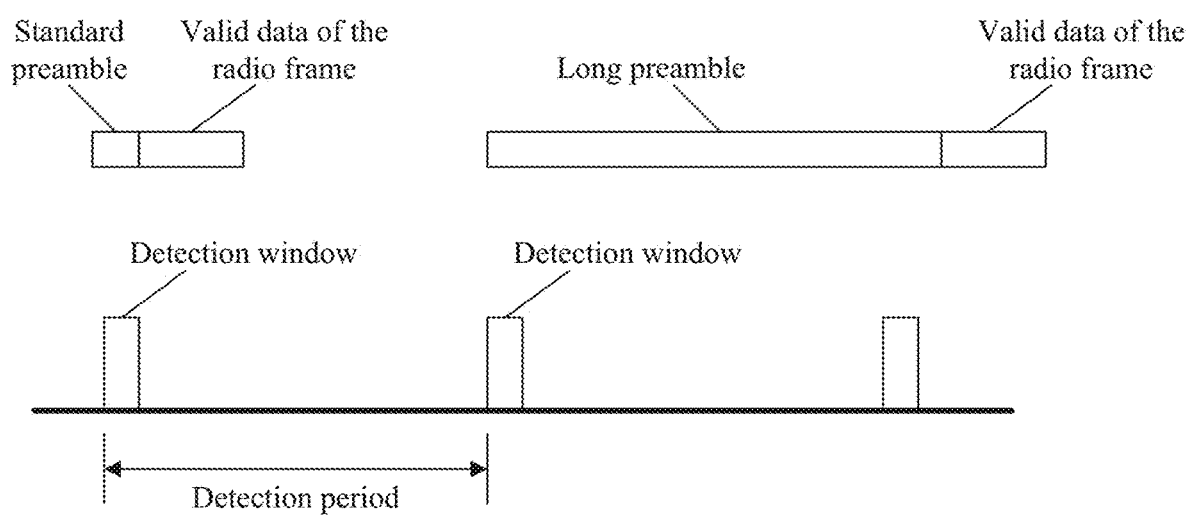
FIG. 1 is a schematic diagram of an existing relay device detecting a preamble.
Figure 2:
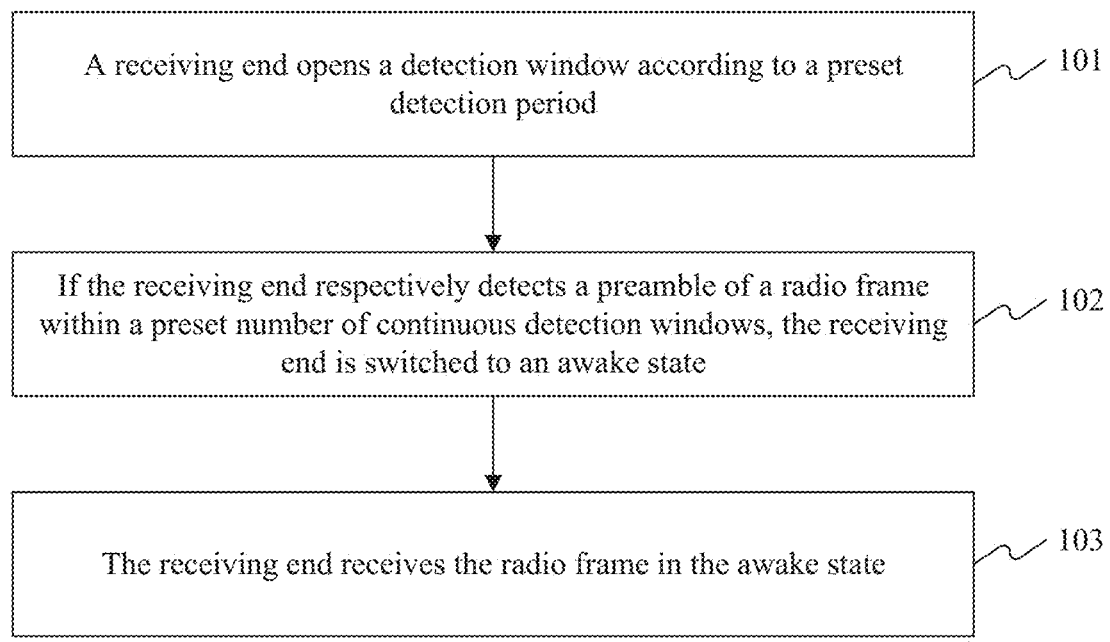
FIG. 2 is a flowchart of an exemplary communication method, consistent with some embodiments of the present disclosure.

FIG. 2 is a flowchart of an exemplary communication method, consistent with some embodiments of the present disclosure. The method can include the following steps.

In step 101, the receiving end opens a detection window according to a preset detection period.

The receiving end can be a LoRa relay device, and the relay device can be used as a standard node to access a LoRa network. After the relay device accesses the LoRa network, the relay device can communicate with a base station and a terminal respectively, and the terminal can communicate with the base station through the relay device.

When the terminal needs to communicate with the base station through the relay device, the terminal can send a radio frame with a long preamble, and the terminal can also send a radio frame with a standard preamble. However, the relay device is usually only expected to receive the radio frame with the long preamble sent by the terminal, instead of the radio frame with the standard preamble sent by the terminal.

In some embodiments, the receiving end can also be a terminal, and a terminal in a sleep state also needs to be awakened by the long preamble, and the terminal receives a radio frame in an awake state.

The receiving end can open a detection window according to a preset detection period to detect a preamble of a radio frame. When the detection window is opened, the receiving end can detect preambles. The preset detection period is periodic such that the detection window is opened after each detection period.

In step 102, if the receiving end respectively detects a preamble of a radio frame within a preset number of continuous detection windows, the receiving end is switched to an awake state.

As described above, the preamble of the radio frame can include a standard preamble and a long preamble. The standard preamble is a preamble in a standard format specified by the LoRaWAN protocol; and the long preamble refers to a preamble having the number of symbols more than that of the standard preamble under the same spreading factor. The long preamble can be used to wake up the relay device. Similarly, the long preamble can also be used to wake up the terminal.

The standard preamble is not used to wake up the receiving end, and the length of the standard preamble is at a microsecond level.

Due to power consumption considerations, the detection period for the receiving end to detect the long preamble cannot be too small. For example, the detection period can be set at a second level.

In some embodiments, the length of the long preamble is greater than the length of the detection window plus the length of the preset detection period, so the long preamble can be detected by the receiving end in a preset number of continuous detection windows.

For example, if the receiving end detects the preamble in two continuous detection windows, it can be determined that the preamble is a long preamble, and therefore, the receiving end is switched from the sleep state to the awake state.

In some embodiments, the length of the standard preamble is not greater than the length of the detection window plus the length of the preset detection period, so the standard preamble is not detected by the receiving end in a preset number of continuous detection windows.

If the receiving end detects a preamble in one detection window, but does not detect the preamble in the next detection window, it can be considered that the preamble is a standard preamble, so the receiving end remains in the sleep state.

In some embodiments, the preset number of continuous detection windows is at least two, which can be specifically set according to actual conditions.

In the case of a fixed long preamble, the shorter the detection period, the greater the preset number can be set, leading to higher power consumption of the receiving end; and the longer the detection period, the smaller the preset number can be set, leading to lower power consumption of the receiving end.

In some embodiments, if the receiving end does not respectively detect the preamble of the radio frame within the preset number of continuous detection windows, the receiving end is not switched to the awake state.

For example, if the receiving end does not respectively detect the preamble of the radio frame within two continuous detection windows, the receiving end is not switched to the awake state.

In step 103, the receiving end receives the radio frame in the awake state.

The preamble of the radio frame is followed by valid data of the radio frame. After the receiving end is switched from the sleep state to the awake state, the receiving end receives the valid data of the radio frame.

In some embodiments, only when detecting a preamble in continuous detection windows can the receiving end be switched to an awake state. It is feasible to switch the receiving end to the awake state only when a long preamble is detected; and when a standard preamble is detected, the receiving end is not be switched to the awake state. Through the continuous detection mechanism, the probability that the receiving end is awakened by mistake is reduced.

Figure 3:
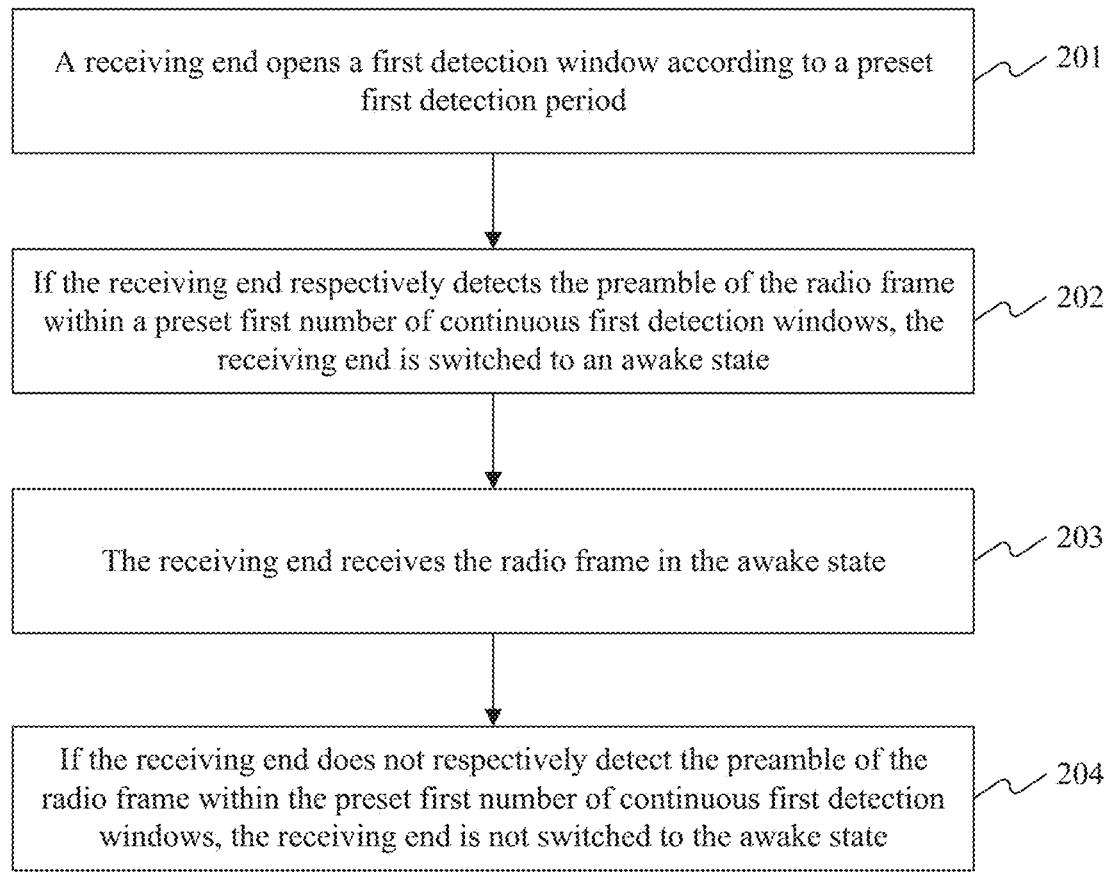
FIG. 3 is a flowchart of an exemplary communication method, consistent with some embodiments of the present disclosure.

FIG. 3 is a flowchart of an exemplary communication method, consistent with some embodiments of the present disclosure. The method can include the following steps.

In step 201, the receiving end opens a first detection window according to a preset first detection period.

In some embodiments, the receiving end can be a LoRa relay device, and the relay device can be used as a standard node to access a LoRa network. After the relay device accesses the LoRa network, the relay device can communicate with a base station and a terminal respectively, and the terminal can communicate with the base station through the relay device.

In some embodiments, the receiving end can also be a terminal, and a terminal in a sleep state also needs to be awakened by the long preamble, and the terminal receives a radio frame in an awake state.

The receiving end can open a first detection window according to a preset first detection period to detect a preamble of a radio frame.

In step 202, if the receiving end detects a preamble of the radio frame in at least a preset number of continuous detection windows of the plurality of detection windows, the receiving end is switched to the awake state. The preset number is set such that a first duration spanning the preset number of continuous detection windows (e.g., three windows) is shorter than a first threshold length (e.g., a length of a long preamble) and is longer than a second threshold length (e.g., a length of a standard preamble), and a second duration spanning a first threshold number of continuous detection windows of the plurality of detection windows (e.g., two windows) is shorter than the second threshold length (e.g. the length of the standard preamble), and the first threshold number is one less than the preset number.

In an example, a duration D1 spanning two of first detection windows can be shorter than a preamble length of a radio frame not intended to be received by the receiving end device (e.g., a standard preamble), then D1 is both shorter than a standard preamble and shorter than a long preamble, using two of first detection windows cannot distinguish between the standard preamble and the long preamble. Therefore, three of first detection windows can be used if a duration D2 spanning three windows is longer than the standard preamble but shorter than the long preamble.

The preambles of the radio frames can include standard preambles and long preambles.

In some embodiments, the first threshold length is a length of a long preamble, and the second threshold length is a length of a standard preamble.

In some embodiments, the first threshold length can be set as a minimum preamble length for radio frames intended to be received by the receiving end device and the second threshold length can be set as a maximum preamble length for radio frames not to be received. The preamble of radio frames intended to be received can be set longer than the preamble of radio frames not intended to be received.

Figure 4:
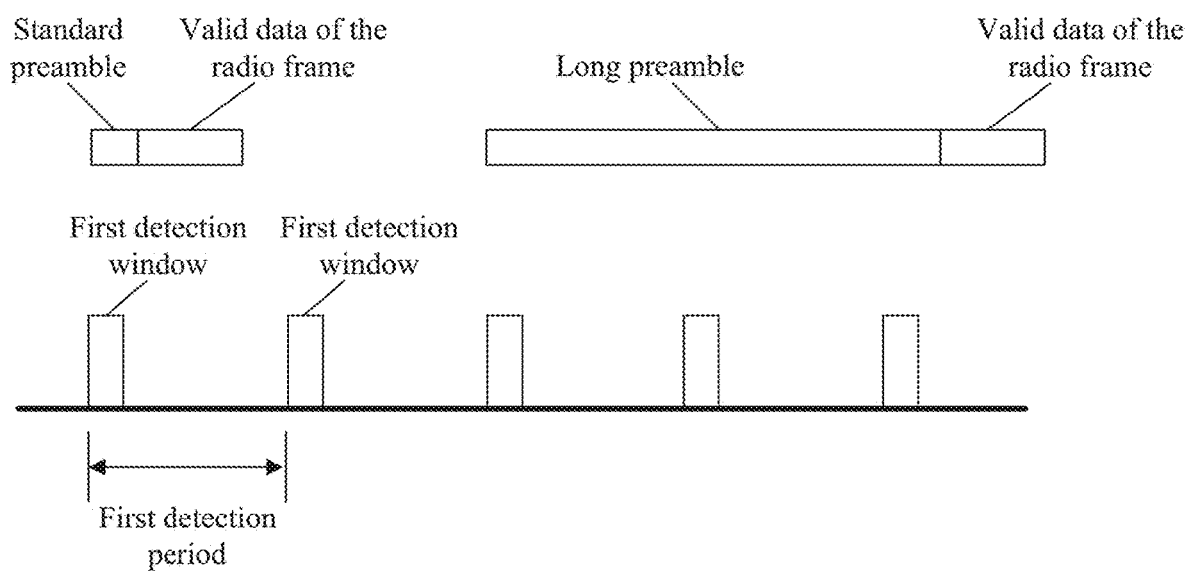
FIG. 4 is a schematic diagram of exemplary detection of a preamble by a receiving end, consistent with some embodiments of the present disclosure.

FIG. 4 is a schematic diagram of exemplary detection of a preamble by a receiving end, consistent with some embodiments of the present disclosure.

In some embodiments, the length of the long preamble is greater than the length of the first detection window plus the length of the preset first detection period. Therefore, the long preamble can be detected by the receiving end within the preset first number of continuous first detection windows.

For example, if the receiving end detects a preamble in two continuous first detection windows, it can be considered that the preamble is a long preamble, and therefore, the receiving end is switched from the sleep state to the awake state.

The length of the standard preamble is not greater than the length of the first detection window plus the length of the preset first detection period, so the standard preamble is not be detected by the receiving end within the preset first number of continuous first detection windows.

For example, if the receiving end detects a preamble in one first detection window, but does not detect the preamble in the next first detection window, it can be considered that the preamble is a standard preamble, so the receiving end remains in the sleep state.

In some embodiments, the preset first number is at least two, which can be specifically set according to actual conditions. For example, the preset first number can be three or four.

In the case of a fixed long preamble, the smaller the first detection period, the larger the preset first number that can be set, but the power consumption of the receiving end can be higher. The larger the first detection period, the smaller the preset first number that can be set, but the power consumption of the receiving end can be lower.

In step 203, the receiving end receives the radio frame in the awake state.

After the receiving end is switched from the sleep state to the awake state, it receives valid data of the radio frame.

In step 204, if the receiving end does not respectively detect the preamble of the radio frame within the preset first number of continuous first detection windows, the receiving end is not switched to the awake state.

For example, the preset first number is three, the receiving end does not detect the preamble of the radio frame within each window of the preset first number of continuous first detection windows in the following situations.

In a first situation, the receiving end does not detect the preamble of the radio frame within a first detection window.

In a second situation, the receiving end detects the preamble of the radio frame in the first one of the first detection windows but does not detect the preamble of the radio frame in the second one of the first detection windows.

In a third situation, the receiving end detects the preamble of the radio frame in both the first one of first detection windows and the second one of the first detection windows but does not detect the preamble of the radio frame in the third one of the first detection windows.

In some embodiments, only when the receiving end respectively detects the preamble in the preset first number of continuous first detection windows can it be switched to the awake state. It is feasible to switch the receiving end to the awake state only when a long preamble is detected; and when a standard preamble is detected, the receiving end is not switched to the awake state. Through the continuous detection mechanism, the probability that the receiving end is awakened by mistake is reduced.

In some conventional systems, a preamble is detected based on only one detection window. In the embodiments of the present disclosure, for long preambles having the same length of the conventional systems, the length of the first detection period can be set smaller than that of the detection period of the conventional systems. Thus, a long preamble can be detected in at least two continuous detection windows; while a standard preamble cannot be respectively detected in the at least two continuous detection windows, so the probability that the receiving end is awakened by mistake can be reduced.

Figure 5:
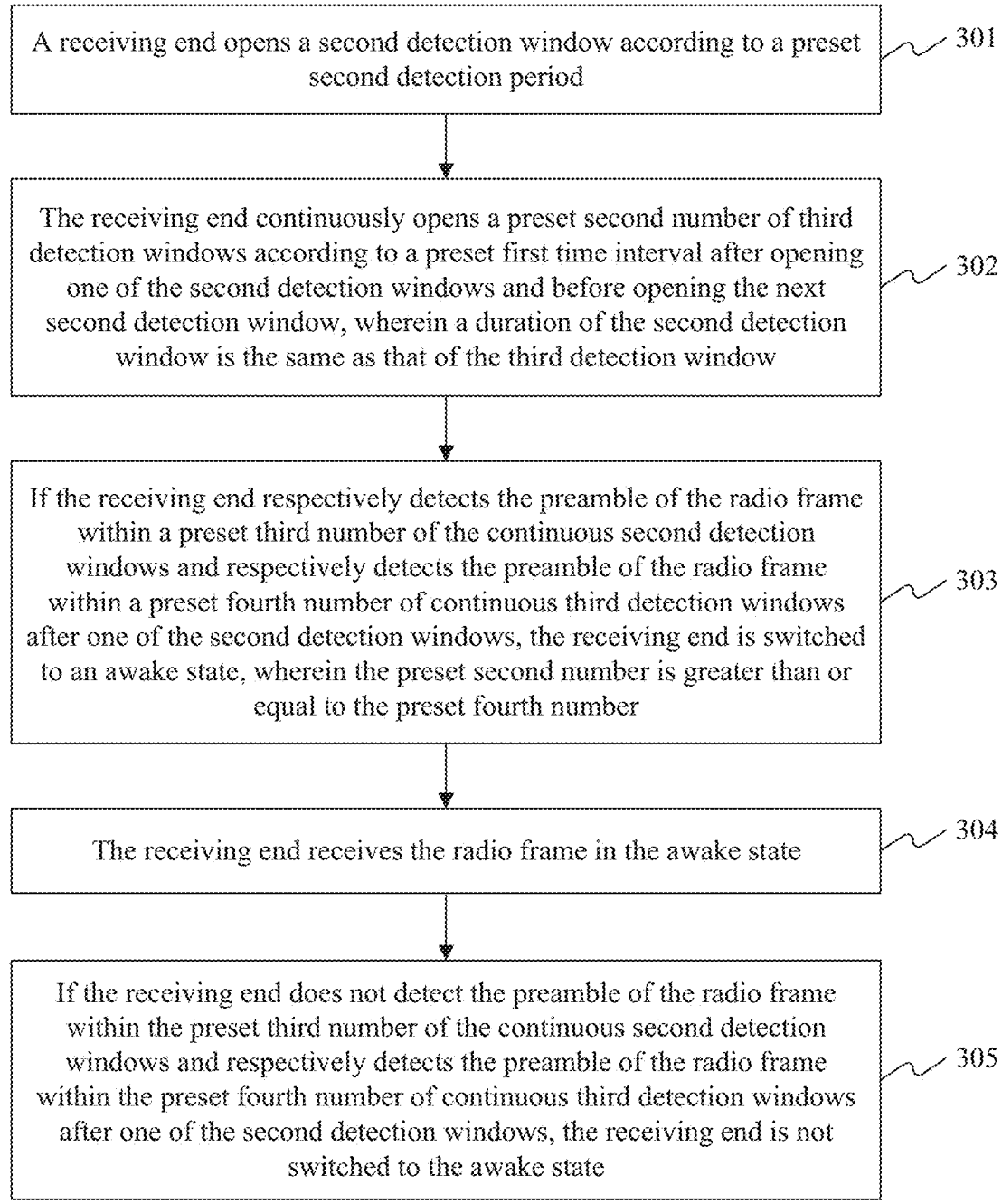
FIG. 5 is a flowchart of an exemplary communication method, consistent with some embodiments of the present disclosure.

FIG. 5 is a flowchart of an exemplary communication method, consistent with some embodiments of the present disclosure. The method can include the following steps.

In step 301, the receiving end opens a second detection window according to a preset second detection period.

In some embodiments, the receiving end can be a LoRa relay device, and the relay device can be used as a standard node to access a LoRa network. After the relay device accesses the LoRa network, the relay device can communicate with a base station and a terminal respectively, and the terminal can communicate with the base station through the relay device.

In some embodiments, the receiving end can also be a terminal, and a terminal in a sleep state also needs to be awakened by the long preamble, and the terminal receives a radio frame in an awake state.

The receiving end can open a second detection window according to a preset second detection period to detect a preamble of a radio frame.

In step 302, the receiving end continuously opens a preset second number of third detection windows according to a preset first time interval after opening one of the second detection window and before opening the next second detection window, wherein a duration of the second detection window is the same as that of the third detection window.

In some embodiments, the preset second number can be at least one, that is, after opening one second detection window, the receiving end can continuously open at least one third detection window according to the first time interval. The preset first number can be specifically set according to actual conditions. For example, the preset second number can be three or four.

In some embodiments, the third detection windows are opened non-periodically by the receiving end. The receiving end does not open the third detection window every time after a second detection window is opened. The receiving end can open the third detection window only after a specific second detection window.

In an example, the receiving end can temporarily open the third detection window after a second detection window. For example, when a certain condition is met, the receiving end temporarily opens the third detection window after a second detection window.

In another example, the receiving end can open the third detection window only after the corresponding second detection window at an interval of every certain number of second detection windows.

For example, the receiving end can open the third detection window after the corresponding second detection window at every other second detection window. when the receiving end continuously opens four second detection windows according to the second detection period, the receiving end can open multiple third detection windows after the first one of the second detection windows and before the second one of the second detection windows; and the receiving end can open multiple third detection windows after the third one of the second detection windows and before the fourth one of the second detection windows.

In step 303, if the receiving end respectively detects the preamble of the radio frame in at least a preset third number of one or more continuous second detection windows of the plurality of second detection windows and having detected the preamble of the radio frame in at least a preset fourth number of continuous third detection windows of the preset second number of third detection windows after one of the detected one or more continuous second detection windows, the receiving end is switched to the awake state, wherein the preset second number is greater than or equal to the preset fourth number.

In some embodiments, the preset third number and the preset fourth number are set such that a third duration spanning both the preset third number of one or more continuous second detection windows and the preset fourth number of continuous third detection windows is shorter than a third threshold length (e.g., a length of a long preamble) and is longer than a fourth threshold length (e.g., a length of a standard preamble), and a fourth duration spanning both the preset third number of one or more continuous second detection windows and a second threshold number of continuous third detection windows is shorter than the fourth threshold length (e.g., the length of the standard preamble), and the second threshold number is one less than the preset fourth number. For example, a duration D3 spanning 1 second detection window and 2 third detection windows is shorter than a standard preamble. Since D3 is also shorter than a long preamble, the combination of 1 second detection window and 2 third detection windows is not sufficient to distinguish a standard preamble and a long preamble. Thus, a combination of 1 second detection window and 3 third detection windows can be used to distinguish the standard preamble and the long preamble if a duration D4 spanning this combination of windows is longer than the standard preamble and is shorter than the long preamble.

For example, the preset third number is one, and the preset fourth number is two. The receiving end detects the preamble of the radio frame in one second detection window, and respectively detects the preamble of the radio frame in two continuous third detection windows after the second detection window, and then the receiving end is switched to the awake state.

For another example, the preset third number is two, and the preset fourth number is three. The receiving end detects the preamble of the radio frame in two second detection windows, and respectively detects the preamble of the radio frame in three continuous third detection windows after the second of the second detection windows, and then the receiving end is switched to the awake state.

The preambles of the radio frames can include standard preambles and long preambles.

Figure 6:
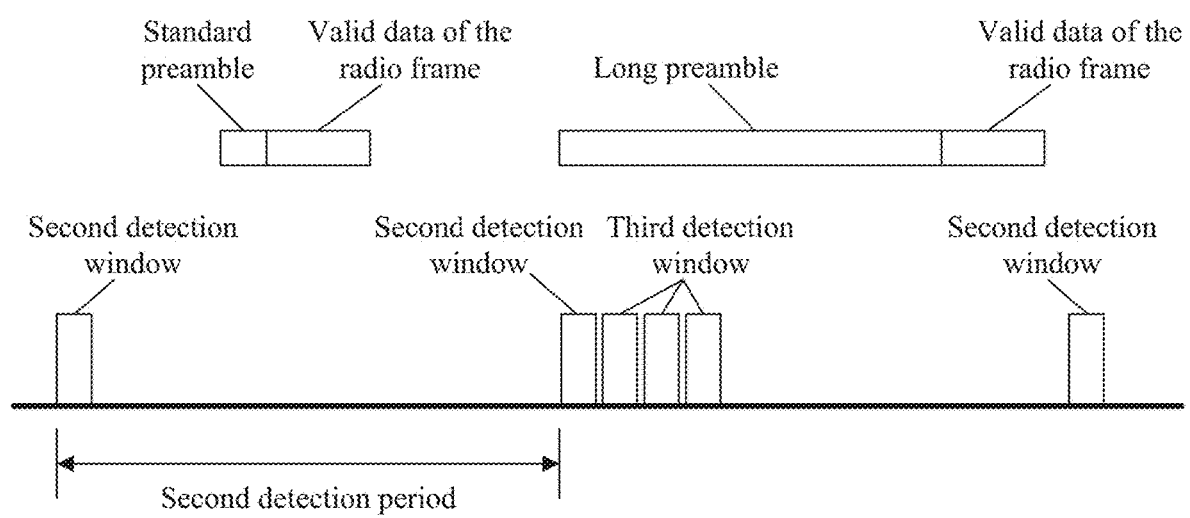
FIG. 6 is a schematic diagram of exemplary detection of a preamble by a receiving end, consistent with some embodiments of the present disclosure.

FIG. 6 is a schematic diagram of exemplary detection of a preamble by a receiving end, consistent with some embodiments of the present disclosure. The length of the long preamble can be greater than the length of the second detection window plus the length of the preset second detection period.

Since the receiving end can open a preset second number of third detection windows between two second detection windows, the long preamble can be detected by the receiving end in the preset second number of continuous third detection windows.

For example, the preset second number is three. The receiving end opens three third detection windows within a duration of the second detection period after opening one second detection window, so the long preamble can be detected by the receiving end in the second detection window and the three continuous third detection windows thereafter.

The length of the second detection window is the same as that of the third detection window. The length of the long preamble is greater than the length of the third detection window plus the length of the preset second detection period.

In some embodiments, the preset second number is greater than or equal to the preset fourth number, and the length of the standard preamble can be less than the length of the preset fourth number of third detection windows plus the length of the preset fourth number of preset first time intervals, and therefore, the standard preamble is not detected by the receiving end in both one second detection window and the preset fourth number of continuous third detection windows thereafter. Therefore, it can be considered that a preamble respectively detected by the receiving end in both one second detection window and the preset fourth number of continuous third detection windows thereafter is a long preamble.

For example, the preset fourth number is two, and the length of the standard preamble is less than the length of two third detection windows plus the length of two first time intervals. The standard preamble is not be detected by the receiving end in one second detection window and two continuous third detection windows thereafter.

Setting the preset third number as one can allow distinguishing the long preamble from the standard preamble. For example, when the preset third number is 1 and the preset fourth number is 2, detecting the preamble in one of the second detection windows and each of the subsequent two third detection windows can lead to a determination that the preamble is a long preamble. In comparison, in the example as shown in FIG. 6, detecting the preamble in at least two continuous first detection windows can lead to a determination that the preamble is a long preamble. In practice, the preset third number can be adjusted.

Referring back to FIG. 4, in step 304, the receiving end receives the radio frame in the awake state.

After the receiving end is switched from the sleep state to the awake state, it receives valid data of the radio frame.

In step 305, if the receiving end does not detect the preamble of the radio frame within the preset third number of the continuous second detection windows and respectively detects the preamble of the radio frame within the preset fourth number of continuous third detection windows after one of the second detection windows, the receiving end is not switched to the awake state. For example, the preset third number is one, and the preset fourth number is two. The receiving end does not detect the preamble of the radio frame in one second detection window and respectively detects the preamble of the radio frame in two continuous third detection windows after the second detection window in the following situations.

In a first situation, the receiving end does not detect the preamble of the radio frame in the second detection window.

In a second situation, the receiving end detects the preamble of the radio frame in the second detection window but does not detect the preamble of the radio frame in the first of third detection windows after the second detection window.

In a third situation, the receiving end detects the preamble of the radio frame in the second detection window and detects the preamble of the radio frame in the first of the third detection windows after the second detection window but does not detect the preamble of the radio frame in the second of the third detection windows after the second detection window.

As described above, in some conventional systems, a preamble is detected based on only one detection window. In the embodiments of the present disclosure, for long preambles having the same length of the conventional systems, in addition to the second detection period, the third detection windows are provided. Through the third detection windows opened non-periodically, the long preamble can be respectively detected in each of the preset third number of continuous second detection windows and each of the preset fourth number of continuous third detection windows after one of the second detection windows. In contrast, the standard preamble cannot be respectively detected in each of the preset third number of continuous second detection windows and each of the preset fourth number of continuous third detection windows after one of the second detection windows. Therefore, the receiving end is awakened by long preambles for receiving radio frames of the long preambles and the receiving end is not awakened by standard preambles by mistake.

For example, the long preamble can be respectively detected in one second detection window and the preset third number of continuous third detection windows after the second detection window. However, the standard preamble cannot be respectively detected in all of one second detection window and the preset third number of continuous third detection windows after the second detection window.

The third detection windows are not opened periodically, therefore the third detection windows do not occupy a substantial portion of a total time and including the third detection windows do not increase much power consumption of the receiving.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Figure 7:
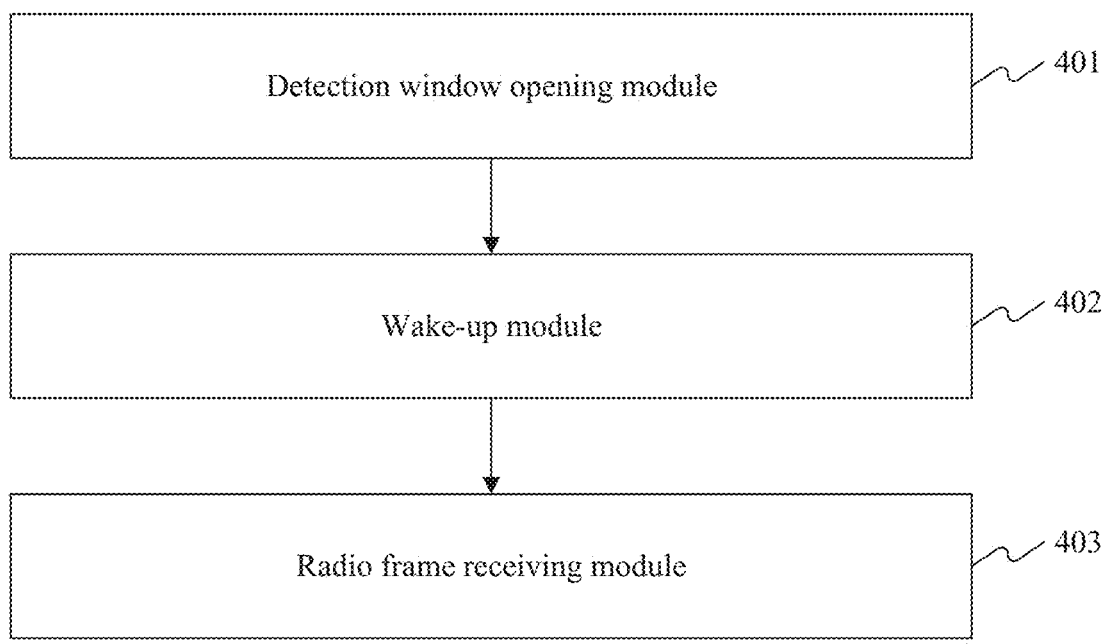
FIG. 7 is a structural block diagram of an exemplary communication apparatus, consistent with some embodiments of the present disclosure.

FIG. 7 is a structural block diagram of an exemplary communication apparatus, consistent with some embodiments of the present disclosure. The apparatus can be a receiving end. The apparatus can include a detection window opening module 401, a wake-up module 402, and a radio frame receiving module 403.

Detection window opening module 401 is configured to open a detection window according to a preset detection period.

Wake-up module 402 is configured to switch the receiving end to an awake state if the receiving end respectively detects a preamble of a radio frame within a preset number of continuous detection windows.

Radio frame receiving module 403 is configured to receive the radio frame in the awake state.

In some embodiments, the apparatus can further include: a holding module configured to not switch the receiving end to the awake state if the receiving end does not respectively detect the preamble of the radio frame within the preset number of continuous detection windows.

In some embodiments, detection window opening module 401 can include: a first detection window opening sub-module configured to open a first detection window according to a preset first detection period.

Wake-up module 402 can include a first wake-up sub-module configured to switch the receiving end to the awake state if the receiving end respectively detects the preamble of the radio frame within a preset first number of continuous first detection windows.

The holding module can include: a first holding sub-module configured to not switch the receiving end to the awake state if the receiving end does not respectively detect the preamble of the radio frame within the preset first number of continuous first detection windows.

In some embodiments, detection window opening module 401 can include: a second detection window opening sub-module configured to open a second detection window according to a preset second detection period; and a third detection window opening sub-module configured to continuously open a preset second number of third detection windows according to a preset first time interval after opening one of the second detection window and before opening the next second detection window, wherein a duration of the second detection window is the same as that of the third detection window.

Wake-up module 402 can include: a second wake-up sub-module configured to switch the receiving end to the awake state if the receiving end respectively detects the preamble of the radio frame within a preset third number of the continuous second detection windows and respectively detects the preamble of the radio frame within a preset fourth number of continuous third detection windows after one of the second detection windows, wherein the preset second number is greater than or equal to the preset fourth number.

The holding module can include: a second holding submodule configured to not switch the receiving end to the awake state if the receiving end does not detect the preamble of the radio frame within the preset third number of the continuous second detection windows and respectively detects the preamble of the radio frame within the preset fourth number of continuous third detection windows after one of the second detection windows.

The embodiments further provide an apparatus, including: one or more processors; and one or more machine-readable media having instructions stored thereon, wherein when executed by the one or more processors, the instructions cause the apparatus to perform the above-mentioned methods.

The embodiments further provide one or more machine-readable media having instructions stored thereon, wherein the instructions, when executed by one or more processors, cause the processors to execute the above-mentioned methods.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

What is claimed is:

1. A communication method performed by a receiving end device, comprising:
    opening a plurality of first detection windows according to a preset first detection period; and
    continuously opening a preset first number of second detection windows according to a preset first time interval after opening one of the first detection windows and before opening a next one of the first detection windows, wherein a duration of each of the first detection windows is the same as a duration of each of the second detection windows;
    in response to having detected a long preamble of a radio frame in at least a preset second number of consecutive second detection windows, switching the receiving end device to an awake state; and
    receiving the radio frame while the receiving end device is operating in the awake state.

2. The method according to claim 1, wherein the preset second number is set such that a first duration spanning the preset second number of consecutive second detection windows is shorter than a first threshold length and is longer than a second threshold length, and a second duration spanning a first threshold number of consecutive second detection windows is shorter than the second threshold length, and the first threshold number is one less than the preset second number.

3. The method according to claim 1, wherein in response to having detected the long preamble of the radio frame in at least the preset second number of consecutive second detection windows, switching the receiving end device to the awake state comprises:

in response to both having detected the long preamble of the radio frame in at least a preset third number of one or more consecutive first detection windows of the plurality of first detection windows and having detected the long preamble of the radio frame in at least a preset fourth number of consecutive second detection windows of the preset second number of second detection windows after one of the detected one or more consecutive first detection windows, switching the receiving end device to the awake state, wherein the preset second number is greater than or equal to the preset fourth number.

4. The method according to claim 3, wherein
the preset third number and the preset fourth number are set such that a third duration spanning both the preset third number of one or more consecutive first detection windows and the preset fourth number of consecutive second detection windows is shorter than a third threshold length and longer than a fourth threshold length, and a fourth duration spanning both the preset third number of one or more consecutive first detection windows and a second threshold number of consecutive second detection windows is shorter than the fourth threshold length, and the second threshold number is one less than the preset fourth number.

5. A communication apparatus, comprising:
a memory storing a set of instructions; and
one or more processors configured to execute the set of instructions to cause the apparatus to perform:

opening a plurality of first detection windows according to a preset first detection period; and continuously opening a preset first number of second detection windows according to a preset first time interval after opening one of the first detection windows and before opening a next one of the first detection windows, wherein a duration of each of the first detection windows is the same as a duration of each of the second detection windows;

in response to having detected a long preamble of a radio frame in at least a preset second number of consecutive second detection windows, switching the apparatus to an awake state; and receiving the radio frame while the apparatus is operating in the awake state.

6. The apparatus according to claim 5, wherein the preset second number is set such that a first duration spanning the preset second number of consecutive second detection windows is shorter than a first threshold length and is longer than a second threshold length, and a second duration spanning a first threshold number of consecutive second detection windows is shorter than the second threshold length, and the first threshold number is one less than the preset second number.

7. The apparatus according to claim 5, wherein in response to having detected the long preamble of the radio frame in at least the preset second number of consecutive second detection windows, switching the apparatus to the awake state comprises:

in response to both having detected the long preamble of the radio frame in at least a preset third number of one or more consecutive first detection windows of the plurality of first detection windows and having detected the long preamble of the radio frame in at least a preset fourth number of consecutive second detection windows of the preset second number of second detection windows after one of the detected one or more consecutive first detection windows, switching the apparatus to the awake state, wherein the preset second number is greater than or equal to the preset fourth number.

8. The apparatus according to claim 7, wherein:
the preset third number and the preset fourth number are set such that a third duration spanning both the preset third number of one or more consecutive first detection windows and the preset fourth number of consecutive second detection windows is shorter than a third threshold length and longer than a fourth threshold length, and a fourth duration spanning both the preset third number of one or more consecutive first detection windows and a second threshold number of consecutive second detection windows is shorter than the fourth threshold length, and the second threshold number is one less than the preset fourth number.

9. A non-transitory computer readable medium that stores a set of instructions that is executable by at least one processor of a computer to cause the computer to perform a communication method, the method comprising:

opening a plurality of first detection windows according to a preset first detection period; and continuously opening a preset first number of second detection windows according to a preset first time interval after opening one of the first detection windows and before opening a next one of the first detection windows, wherein a duration of each of the first detection windows is the same as a duration of each of the second detection windows;

in response to having detected a long preamble of a radio frame in at least a preset second number of consecutive second detection windows, switching the computer to an awake state; and receiving the radio frame while the computer is operating in the awake state.

10. The non-transitory computer readable medium of claim 9, wherein the preset second number is set such that a first duration spanning the preset second number of consecutive second detection windows is shorter than a first threshold length and is longer than a second threshold length, and a second duration spanning a first threshold number of consecutive second detection windows is shorter than the second threshold length, and the first threshold number is one less than the preset second number.

11. The non-transitory computer readable medium of claim 9, wherein in response to having detected the long preamble of the radio frame in at least the preset second number of consecutive second detection windows, switching the computer to the awake state comprises:

in response to both having detected the long preamble of the radio frame in at least a preset third number of one or more consecutive first detection windows of the plurality of first detection windows and having detected the long preamble of the radio frame in at least a preset fourth number of consecutive second detection windows of the preset second number of second detection windows after one of the detected one or more consecutive first detection windows, switching the computer to the awake state, wherein the preset second number is greater than or equal to the preset fourth number.

12. The non-transitory computer readable medium of claim 11, wherein
the preset third number and the preset fourth number are set such that
a third duration spanning both the preset third number of one or more consecutive first detection windows and the preset fourth number of consecutive second detection windows is shorter than a third threshold length and longer than a fourth threshold length, and
a fourth duration spanning both the preset third number of one or more consecutive first detection windows and a second threshold number of consecutive second detection windows is shorter than the fourth threshold length, and the second threshold number is one less than the preset fourth number.

\* \* \* \* \*